Apr. 24, 1923.
I. A. CALL ET AL
1,452,547
INSULATED WHEEL STRUCTURE
Filed June 22, 1922
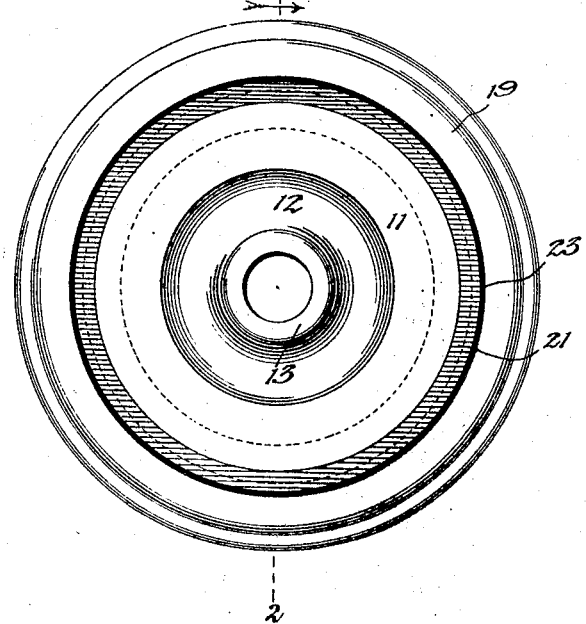
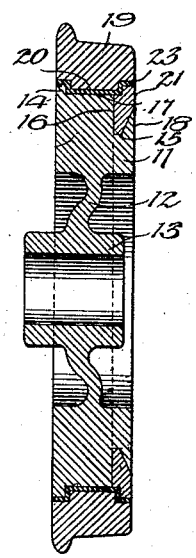
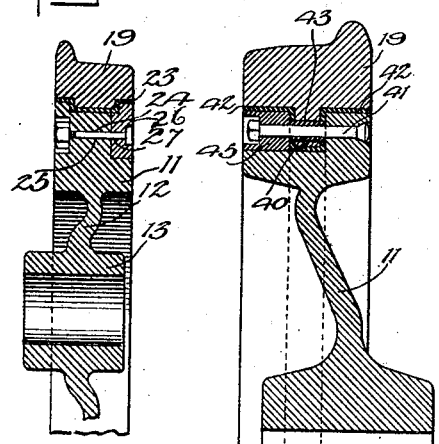
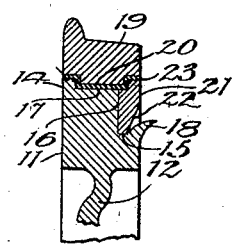
WITNESSES
William P. Goebel
P. H. Pattison
INVENTOR
Ira A. Call
Joseph C. Call
BY
Munn & Co
ATTORNEYS Patented Apr. 24, 1923.

1,452,547

UNITED STATES PATENT OFFICE.

IRA A. CALL AND JOSEPH C. CALL, OF NEW YORK, N. Y., ASSIGNORS, BY MESNE ASSIGNMENTS, TO THE IDEAL AUTOMATIC TRAIN CONTROL COMPANY, OF DOVER, NEW JERSEY, A CORPORATION OF NEW JERSEY.

INSULATED WHEEL STRUCTURE.

Application filed June 22, 1922. Serial No. 570,090.

*To all whom it may concern:*

Be it known that we, IRA A. CALL and JOSEPH C. CALL, both citizens of the United States, and residents of the city of New York, borough of Manhattan, in the county and State of New York, have invented a new and Improved Insulated Wheel Structure, of which the following is a full, clear, and exact description.

The present invention relates to new and useful improvements in wheels and it pertains more particularly to wheels adapted for use in connection with railway rolling stock.

It is one of the primary objects of the present invention to provide a wheel particularly adapted for use with electrical block systems which require the insulation of one portion of the wheel with respect to the other portion thereof.

It is a further object of the invention to so construct a wheel for railway rolling stock so that the tire may be insulated with respect to the body of the wheel.

It is a further object of the invention to so construct the wheel that the tire will be rigid with respect to the body portion of the wheel, and, at the same time, be separated therefrom by a layer of insulating material.

With the above and other objects in view, reference is had to the accompanying drawings, in which—

Figure 1 is a view in side elevation of a wheel constructed in accordance with the present invention;

Fig. 2 is a vertical sectional view thereof taken on the line 2—2 of Fig. 1;

Fig. 3 is a detail sectional view of a portion of the wheel showing the manner in which the tire of the wheel is attached to the wheel body with the layer of insulating material interposed therebetween;

Fig. 4 is a detail sectional view of a slightly modified form of the invention.

Fig. 5 is a detail sectional view of a further modified form of the invention.

Referring more particularly to the drawings, the reference character 11 designates the wheel body, 12 the web of the wheel, and 13 the wheel hub. The wheel body is provided on its periphery at one side with a shoulder 14, and the other side of the wheel body is provided with a shoulder 15. Projecting vertically from one side of the shoulder 15 is a wall 16 and said wall 16 terminates flush with the periphery 17 of the wheel body. The wheel body is further provided or formed with a projecting flange 18, and said flange is adapted to be bent at right angles to the wheel body during the manufacture thereof, the flange 18 being formed with its inner face in alinement with the shoulder 15. The reference character 19 designates the tire of the wheel and said tire 19 is formed on its inner periphery with a projection 20 which extends throughout said inner periphery of the tire.

The reference character 21 designates a ring which is preferably continuous and said ring is provided with a beveled annular face 22. The reference character 23 designates a layer of insulating material which is adapted to be interposed with respect to the tire 19 and the body 11 of the wheel.

The wheel is assembled in the following manner:

The insulating material 23 is positioned upon the wheel body 11, after which the tire 19 is positioned thereon. After the tire 19 has been positioned, the ring 21 is then positioned upon the shoulder 15 of the body 11 with its inner face in engagement with the vertical wall 16. After the parts have been thus far assembled, the flange 18 is swaged inwardly into engagement with the angular face or wall 22 of the ring 21, as is clearly shown in Fig. 2, in order that the ring 21 may be retained in position to secure the tire 19 in place.

It is to be understood that in Fig. 3, the flange 18 is shown as partially swaged inwardly after the ring 21 has been positioned on the shoulder 15.

In that form of the invention shown in Fig. 4, the body 11 of the wheel is provided with a plurality of openings 24 for the reception of bolts 25 or other suitable fastening means. In this form a ring 26 is employed and said ring is provided with a plurality of openings 27 adapted to be brought into alinement with the openings 24 in the wheel body 11 in order that the bolts 25 may be passed therethrough to secure the ring 26 and the tire 19 in position.

In that form of the invention shown in Fig. 5, the tire 19 is provided with a depending web 40, and said web is formed with a plurality of openings adapted to receive bolts 41. Interposed between the tire 19 and the body 11 of the wheel is insulating material 42, and said insulating material 42 extends downwardly around the web 40, as shown. Each of the bolt openings is lined with a sleeve 43 of insulating material. The tire 19 is secured in place by means of a ring 45, through which the bolts 41 pass.

This form of the invention is particularly applicable to driving wheels where it is desired to prevent a relative slippage between the wheel body and the tire thereof.

From the foregoing it is apparent that the present invention provides a new and improved wheel for a railway rolling stock adapted for use in connection with electrical signaling apparatus and in which the tire of the wheel may be adequately insulated from the wheel body without detracting from the strength and durability of the wheel.

What is claimed is:

1. In a wheel, a wheel body, a tire, a suitable insulating material interposed between the wheel and the tire, a ring for securing the tire in position relative to the wheel body, and means formed integral with the wheel body and adapted to engage the ring to retain the tire in position relative to the wheel body.

2. In a wheel, a wheel body, a tire, a suitable insulating material interposed between the wheel and the tire, a ring for securing the tire in position relative to the wheel body, and an integral flange adapted to be swaged inwardly of the wheel body and into engagement with the ring to retain the tire in position relative to the wheel body.

3. In a wheel for railway rolling stock, a wheel body, a tire therefor, and means for retaining the tire in position on the wheel body, said retaining means comprising a ring having an angular annular face, and a flange formed integral with the wheel body, said flange having an angular annular face adapted to be swaged into contact with the angular annular face of the ring to secure the ring and tire in position on the wheel body.

IRA A. CALL.
JOSEPH C. CALL.